June 5, 1934.  F. C. FRANK  1,961,848
BRAKE
Filed Dec. 21, 1931
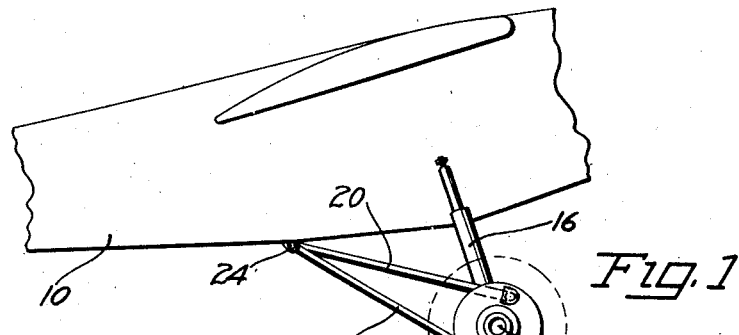
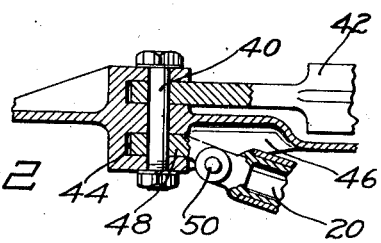
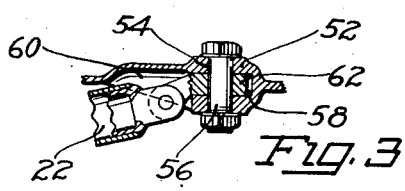
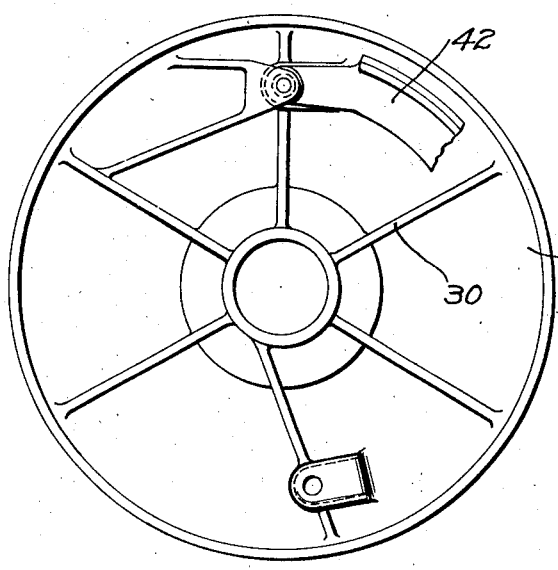
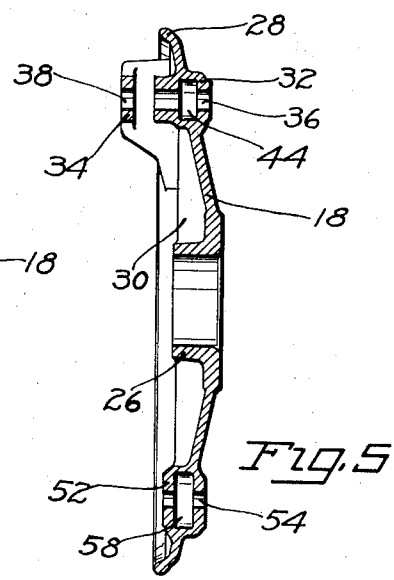
INVENTOR.
FREDERICK C. FRANK
BY
ATTORNEY

Patented June 5, 1934

1,961,848

UNITED STATES PATENT OFFICE 1,961,848

BRAKE

Frederick C. Frank, South Bend, Ind., assignor to Bendix Aviation Corporation, South Bend, Ind., a corporation of Delaware Application December 21, 1931, Serial No. 582,445

13 Claims. (Cl. 188—206)

This invention relates to brakes and more particularly to backing plates therefor.

Broadly, the invention comprehends a brake for airplanes including a backing plate of substantial structure and means for supporting the backing plate, so that all torque loads may be removed from the axle of the landing gear for the plane.

In the illustrated embodiment of the invention the fuselage of an airplane is supported by a landing gear and the axle of the landing gear has mounted thereon a backing plate, and struts connect the backing plate to the fuselage of the plane with flexible members including double swivels between the struts and the backing plate. A flexible connection of this character is capable of resisting the braking torque between the fuselage of the plane without transmitting any of the torque loads to the axle.

An object of the invention is to provide a backing plate including a unitary means receiving torque from the backing plate and a friction element associated with the backing plate.

Another object of the invention is to provide a backing plate and means for relieving the inherent torque imposed thereon by the axle of the airplane.

A further object of the invention is to provide a backing plate of substantial structure and means for flexibly connecting the backing plate to a fixed support.

Yet a further object of the invention is to provide a movable backing plate and means for connecting the backing plate to a fixed support including a double swiveled joint so arranged as to lend flexibility to the structure.

Other objects of the invention will appear from the following description taken in connection with the drawing, which forms a part of this specification, and in which:

Figure 1 is a side elevation of an airplane illustrating the invention as applied;

Figure 2 is a detail view illustrating a single means for attaching the backing plate and for anchoring the friction elements;

Figure 3 is a detail view illustrating a double swiveled connection between a strut and a backing plate;

Figure 4 is a side elevation of the backing plate; and

Figure 5 is a vertical sectional view of the backing plate.

Referring to the drawing for more specific details of the invention, 10 represents the fuselage of an airplane. The fuselage is mounted on a landing gear including an axle 12 supported by two wheels 14, only one of which is shown, and a shock absorbing strut 16 connecting the axle to the fuselage. A backing plate 18 is positioned for slight rotation on the axle and struts 20 and 22 connect the backing plate to the fuselage. The struts 20 and 22 are secured to the fuselage by a pivot 24 common to both struts.

The backing plate 18 comprises a conical member having a central bearing or sleeve 26 for the reception of the axle 12 and a peripheral flange 28 connected to the sleeve by a relatively thin wall reinforced by radial ribs 30. Because of the conical form of the backing plate and the radial ribs, great strength and rigidity is obtained. This is essential because of the stresses and strains imposed on the backing plate during the initial shock of landing and subsequent shocks instant to taxiing over rough and uneven ground. Furthermore, it is particularly desirable that the backing plate should possess rigid characteristics, so that it may resist the braking reaction.

In the wall of the backing plate is a boss 32 and diametrically disposed to this boss is an outboard boss 34. These bosses have oppositely disposed bores 36 and 38 for the reception of a bolt 40 to which the friction element 42 of the brake may be anchored. Arranged in the boss 32 transversely with respect to the bore 36 is a slot 44 communicating with the recesses or depression 46. A member 48 is pivoted to the bolt 40 in the slot 44. This member has an offset portion provided with an eye 50 disposed at right angles in the bore 36 for attaching the strut 20.

In the wall of the backing plate is another boss 52 substantially diametrically disposed to the boss 32. The boss 52 has a bore 54 for the reception of a bolt 56 and a slot 58 transversely disposed to the bore and communicating with a recess or depression 60 in the backing plate. A member 62 is pivotally connected to the bolt 56 in the slot 58. This member is alike in structure to the member 48 and it has attached thereto by the conventional clevis the strut 22.

It is to be observed that the structure provides a single means for attaching the strut and anchoring the friction element of the brake. This is desirable as it materially reduces the number of parts. It is also to be noted that because of the double swiveled connections between the backing plate and struts a very flexible structure is obtained. This is also important because shocks and strains instant to the initial shock of landing, and to subsequent shocks in taxiing will not be abruptly imparted to a backing plate. Furthermore, it provides a flexible means for taking the torque reaction of the brake.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent is:—

1. A brake comprising a backing plate including a conical member, a hub therefor, internal ribs formed integral with the member and hub, diametrically disposed pockets on the member, and attaching means extending transversely through the pockets and plate.

2. A brake comprising a backing plate including a conical member, a hub therefor, a boss on the member having parallel slots and a transverse bore for the reception of a pin.

3. A brake comprising a backing plate including a conical member, a hub on the member, a boss on the member having parallel slots and a transverse bore, a pin positioned in the bore, a strut pivoted on the pin in one of the slots, a friction element pivoted on the pin in the other slot, a diametrically disposed boss having a slot and a transverse bore and a strut pivoted in the slot on a pin positioned in the bore.

4. A brake comprising a backing plate including a conical member, a hub therefor, diametrically disposed pockets in the member lying substantially within the conical member, and struts flexibly attached in the pockets.

5. A brake comprising a backing plate including a conical member having an internal bearing sleeve, radial ribs integral with the bearing and the member, diametrically disposed bosses on the conical member one of the bosses having a slot and a transverse bore for attaching a strut, and the other boss having parallel slots and a transverse bore for attaching a strut and anchoring a friction element.

6. A brake comprising a backing plate having diametrically disposed pockets, and flexible connections attached to the plate in the pockets, said pockets lying substantially in the plate surface.

7. A brake comprising a backing plate including a conical member having diametrically disposed pockets in the wall thereof and double swivelled connections attached to the member within the pockets.

8. A brake comprising a backing plate having a boss provided with parallel slots and a transverse bore, a pin in the bore, a friction element anchored on the pin in one of the slots, and a flexible connection pivoted on the pin in the other slot.

9. A brake comprising a backing plate including a conical member, a boss in the wall of the member having parallel slots and a transverse bore, a pin in the bore, a pocket in the wall of the member communicating with one of the slots, a flexible connection pivoted on the pin in the slot communicating with the pocket, and a friction element anchored on the pin in the other slot.

10. A brake comprising a backing plate, an anchor pin extending through said backing plate, friction means bearing against said anchor pin on one side of the plate and a strut secured to the plate by said anchor pin on the other side of said plate.

11. In a brake, a backing plate, an integral pocket on either side thereof, friction means extending into one of said pockets, a flexible strut extending into the other pocket, and common means passing through both pockets for securing said strut and friction means to the plate.

12. In a brake, a backing plate, a pocket on one side substantially lying within the plate, a strut extending into said pocket from one side of said plate, securing means for said strut passing through said pocket and extending on the opposite side to form an anchor pin.

13. In a brake, a backing plate, a pocket opening on one side substantially lying within the plate, a strut extending into said pocket and securing means passing through said pocket and strut and extending on opposite sides of the plate.

FREDERICK C. FRANK.